United States Patent [19]
Matsumura et al.

[11] Patent Number: 5,771,415
[45] Date of Patent: Jun. 23, 1998

[54] DATA IMPRINTING DEVICE

[75] Inventors: Koichi Matsumura; Michio Hirohata; Ichirou Yasumaru, all of Kanagawa-ken, Japan

[73] Assignee: Canon Kabushiki Kaisha, Tokyo, Japan

[21] Appl. No.: 341,463

[22] Filed: Nov. 17, 1994

Related U.S. Application Data

[63] Continuation of Ser. No. 15,468, Feb. 9, 1993, abandoned.

[30] Foreign Application Priority Data

Feb. 14, 1992 [JP] Japan .................................. 4-059140
Jul. 20, 1992 [JP] Japan .................................. 4-192395

[51] Int. Cl.$^6$ ........................... G03B 17/24; G03B 17/02
[52] U.S. Cl. .......................................... 396/315; 396/435
[58] Field of Search .................................. 354/105, 106, 354/159, 94–99, 125; 396/310, 315, 316, 317, 318, 380, 435, 436

[56] References Cited

U.S. PATENT DOCUMENTS

| | | | |
|---|---|---|---|
| 4,860,039 | 8/1989 | Hata et al. ............................... | 354/106 |
| 4,994,830 | 2/1991 | Harvey .................................... | 354/106 |
| 5,010,357 | 4/1991 | Misawa ................................... | 354/159 |
| 5,086,311 | 2/1992 | Naka et al. ......................... | 354/106 X |
| 5,227,824 | 7/1993 | Yoshida et al. ..................... | 354/159 X |
| 5,245,373 | 9/1993 | Ogawa et al. ........................... | 354/106 |
| 5,398,088 | 3/1995 | Yamazaki et al. ...................... | 354/106 |

FOREIGN PATENT DOCUMENTS 59-184141  12/1984  Japan.

*Primary Examiner*—Eddie C. Lee
*Attorney, Agent, or Firm*—Robin, Blecker & Daley

[57] ABSTRACT

In a data imprinting device of a camera arranged to effect shooting either in a first shooting format in which a scene is recorded on a substantially entire area of a photosensitive zone of a film frame or in a second shooting format in which a part of the photosensitive zone of the film frame is shielded from light to form a light-shielded area thereof and a scene is recorded on a light-unshielded area of the photosensitive zone other than the light-shielded area, there are provided a data imprinting part for imprinting data on a film surface, and a data-imprinting control part arranged to vary a position where the data is to be imprinted by the data imprinting part according whether the shooting is effected in the first shooting format or the second shooting format, so that data imprinted in different shooting formats can be located always in adequate positions within printed pictures irrespectively of the difference in shooting format.

24 Claims, 12 Drawing Sheets

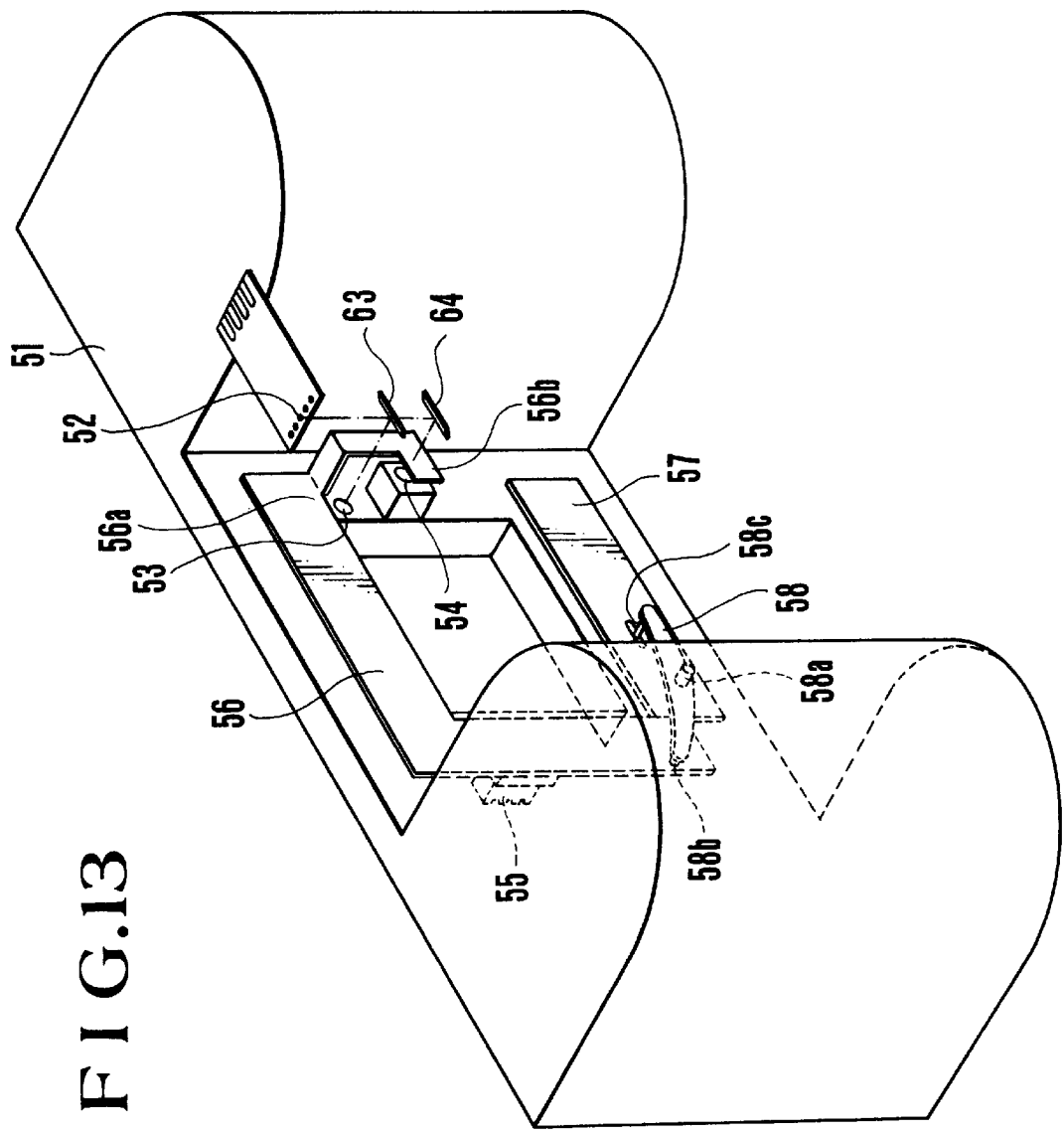
F I G. 13

DATA IMPRINTING DEVICE

This is a continuation application under 37 CFR 1.62 of prior application Ser. No. 08/015,468, filed Feb. 9 1993, now abandoned.

BACKGROUND OF THE INVENTION

1. Field of the Invention

This invention relates to a camera of the kind having a first shooting format in which a scene is recorded on a substantially entire area of an exposable zone of one frame of a film and a second shooting format in which a part of the exposable zone is shielded from light to form a light-shielded area thereof and a scene is recorded on a light-unshielded area of the exposable zone other than the light-shielded area, or to a data imprinting device adapted for the camera of this kind.

2. Description of the Related Art

It has been known to arrange a camera to permit, by an external operation, etc., change-over of its image plane (aperture) size from a normal size to a panorama shot size by vertically shortening the normal image plane size or to a half size by horizontally shortening the normal image plane size.

Meanwhile, data imprinting devices for imprinting information about the date of shots taken, etc., on the film surface have been in use.

It is conceivable to have a data imprinting device incorporated into the camera capable of varying the image plane size. However, the incorporation of the data imprinting device into the camera of this kind presents the following problem:

Among data imprinting devices, a data imprinting device most likely incorporable into the camera of this kind has two imprinting light emitting elements and is arranged to select one of these elements according to the image plane size selected. However, an enlarging magnifying rate at which pictures are to be printed is caused to vary by the change-over of the image plane size. Hence, at the time of printing, the different enlarging magnifying rates result in different sizes of characters imprinted in the pictures printed. More specifically, characters imprinted in a picture on a reduced image plane size are enlarged at the same rate with the picture printed at a larger enlarging magnifying rate than a printed picture obtained from the normal image plane size. In this case, the character imprint occupies a larger area within the whole picture area to make the picture disagreeable.

This problem may be solved by arranging one of the two imprinting light emitting elements to be smaller. However, such arrangement has been difficult because of a limit to the possible reduction in size of the imprinting light emitting element.

Further, it is generally practiced to arrange the two imprinting light emitting elements respectively on different planes. However, the use of different planes has caused unevenness in optical precision such as focus on the character imprint.

SUMMARY OF THE INVENTION

One aspect of this invention lies in the provision of a camera of the kind arranged to permit shooting either in a first shooting format in which a scene is recorded on a substantially entire area of a photosensitive zone of a film frame or in a second shooting format in which a part of the photosensitive zone of the film frame is shielded from light to form a light-shielded area thereof and a scene is recorded on a light-unshielded area of the photosensitive zone other than the light-shielded area, for example, a panorama shooting format in which upper and lower parts of the photosensitive zone are shielded from light and a scene is recorded only on a middle part of the photosensitive zone, or a data imprinting device adapted for the camera of this kind, wherein there are provided data imprinting means for imprinting data on a film surface, and data-imprinting control means arranged to vary a position where the data is to be imprinted by the data imprinting means according to whether the shooting is effected in the first shooting format or the second shooting format, so that the data imprinted in different shooting formats always can be located in adequate positions within printed pictures, irrespectively of the difference in shooting format.

Another aspect of this invention lies in the provision of a camera of the kind arranged to permit shooting either in a normal shooting format in which a scene is recorded on a substantially entire area of a photosensitive zone of a film frame or in a panorama shooting format in which at least either one of upper and lower parts of the photosensitive zone of the film frame is shielded from light to form a light-shielded area thereof and a scene is recorded on a light-unshielded area of the photosensitive zone other than the light-shielded area, or a data imprinting device adapted for the camera of this kind, wherein there are provided data imprinting means for imprinting data on a film surface, and data-imprinting control means arranged to vary the size of the data to be imprinted by the data imprinting means according to whether the shooting is effected in the normal shooting format or the panorama shooting format, so that the size of the data imprint obtained at the time of printing can be kept almost constant by varying the size of the data at the time of imprinting, irrespective as to whether a picture magnifying rate is caused to vary by the selection of the different shooting formats.

A further aspect of the invention lies in the provision of a camera or a data imprinting device for the camera arranged to permit shooting by varying the size of a data imprint at the time of the above-stated data imprinting in the following manner: The data imprinting device includes a first data imprinting member for imprinting data when the shooting is effected in the normal shooting format and a second data imprinting member for imprinting data when the shooting is effected in the panorama shooting format. The first data imprinting member includes a first light emitting member and a first image forming lens arranged to form, on the film surface, an image of light projected from the first light emitting member. The second data imprinting member includes a second light emitting member and a second image forming lens arranged to form, on the film surface, an image of light projected from the second light emitting member, a magnifying power of the second image forming lens being arranged to differ from that of the first image forming lens. According to this arrangement, even in a case where data is imprinted in the different shooting formats, the sizes of the data imprints obtained at the time of printing are almost equal to each other and the optical precision of the data imprints remains uniform.

A still further aspect of the invention lies in the provision of a camera or a data imprinting device of the camera which is arranged to vary, at the time of data imprinting, the size or position of data to be imprinted according to a shooting format of the camera selected, wherein there are provided light emitting means arranged to emit light for imprinting data, a first optical member, and a second optical member.

The data imprinting is arranged to be accomplished by allowing the light emitted by the light emitting means to pass through the first optical member when one shooting format is selected and to pass through the second optical member when another shooting format is selected. The arrangement is such that, even in cases where the data is imprinted in pictures taken in the different shooting formats, the data imprints in the different shooting formats can be obtained, at the time of printing, in sizes nearly equal to each other and located in adequate positions within the printed pictures without recourse to any complex arrangement.

These and other aspects and features of this invention will become apparent from the following detailed description of embodiments thereof taken in connection with the accompanying drawings.

BRIEF DESCRIPTION OF THE DRAWINGS

FIG. 13 is an oblique view showing the essential parts of a camera arranged as a fourth embodiment of this invention as viewed from the front side of the camera.

DETAILED DESCRIPTION OF THE PREFERED EMBODIMENTS

Figure 1:
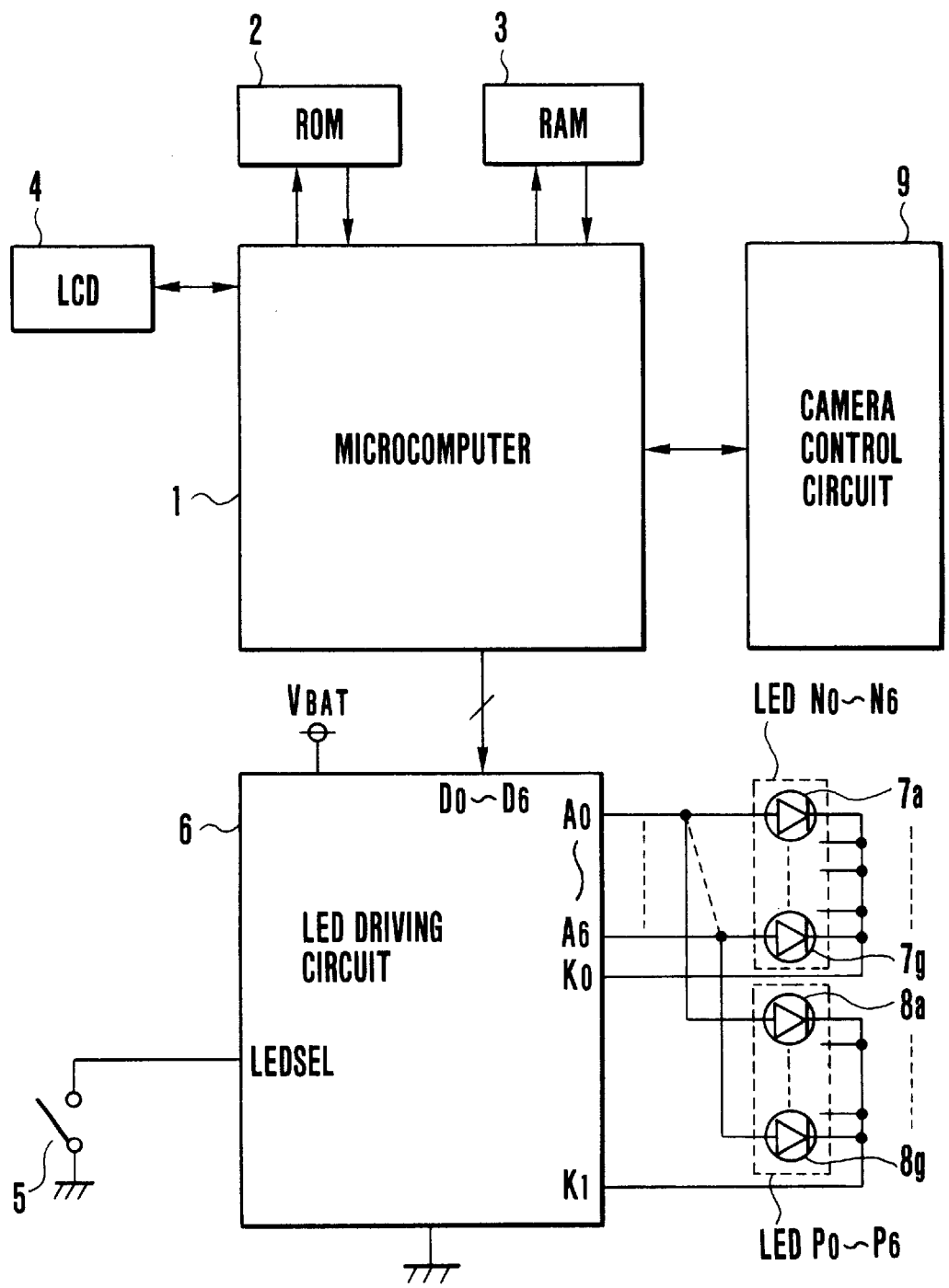
FIG. 1 is a block diagram showing the essential parts of a camera which is provided with a data imprinting device arranged as a first embodiment of this invention.

This invention is described in detail below through the embodiments thereof shown in the drawings:

(First Embodiment)

FIG. 1 shows in a block diagram the arrangement of the essential parts of a camera provided with a data imprinting device which is arranged as a first embodiment of this invention. Referring to FIG. 1, a microcomputer 1 is arranged to control the sequence of actions of the device. A ROM 2 stores programs and the contents of data to be imprinted. A RAM 3 stores data. A liquid crystal display device 4 is arranged to display the contents of the data to be imprinted. A selection switch 5 is provided for selection of an image plane size. A first image plane size which is a normal image plane size is selected when the selection switch 5 is in an off-state. When the selection switch 5 is in an on-state, a second image plane size is selected. The second image plane size is, in the case of this embodiment, a panorama size which is obtained by shielding from light the upper and lower parts of the exposable (or photosensitive) zone of each frame of film. The illustration further includes an LED driving circuit 6, first imprinting LEDs (light emitting elements) 7a to 7g, second imprinting LEDs 8a to 8g, and a camera control circuit 9 which is arranged to control the sequence of shooting actions of the camera and also to form synchronizing pulses for imprinting data by detecting the moving state of the film.

The embodiment has first and second shooting formats. In the first shooting format, a substantially entire area of an exposable zone of the film frame is used in taking a shot of a scene. In other words, the first shooting format is for shooting in a first image plane size. The second shooting format is for shooting in a second image plane size. In this case, a part of the exposable zone of the film frame is shielded from light to form a light-shielded area and a shot of a scene is taken by using only a light-unshielded area of the exposable zone other than the light-shielded area.

Figure 2:
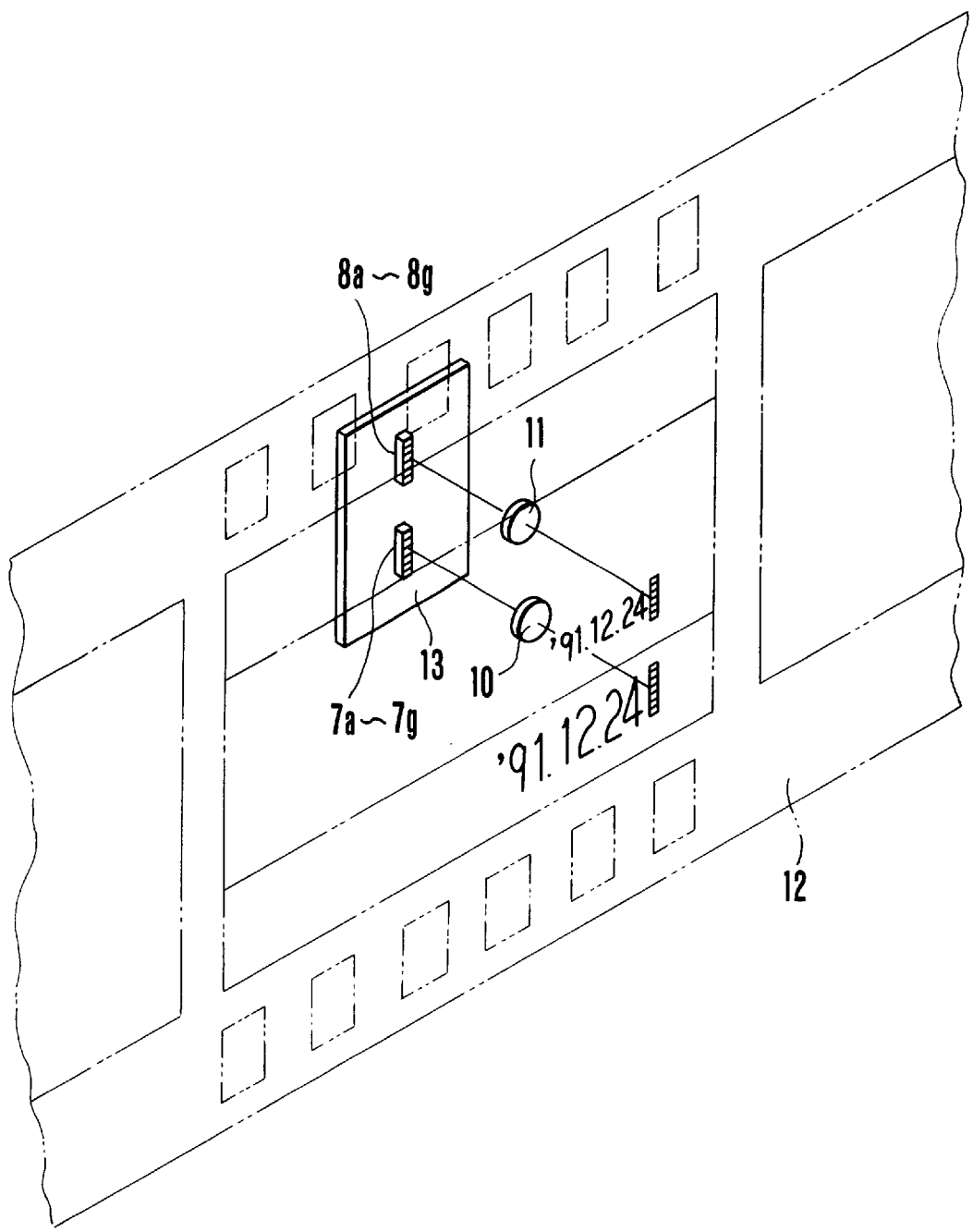
FIG. 2 is an oblique view showing the essential arrangement of an imprinting optical system related to the data imprinting device arranged as the first embodiment.

FIG. 2 shows, in an oblique view, two imprinting optical systems as in a state of being used for imprinting on the film surface. The illustration includes a first imprinting image forming lens 10, a second imprinting image forming lens 11, a film 12, and a circuit board 13 on which the first and second groups of imprinting LEDs 7a to 7g and 8a to 8g are arranged.

Figure 3:
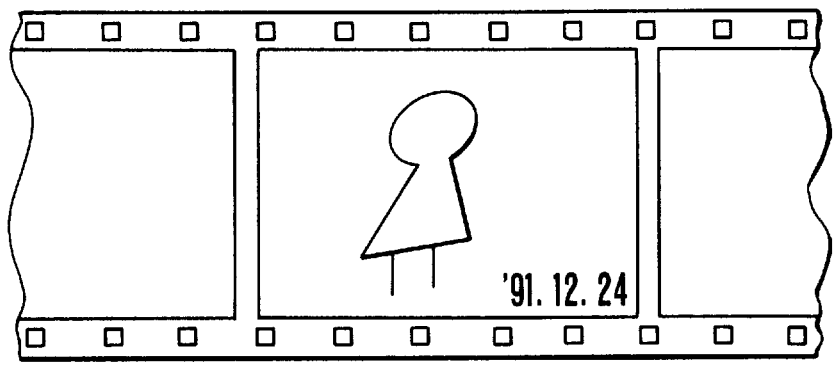
FIG. 3 shows the size of imprinted characters, etc., obtained with a first image plane size selected by the device arranged as the first embodiment.

FIG. 3 shows the size of the shooting image plane, the size of characters imprinted and the position of the imprint obtained in the first image plane size.

Figure 4:
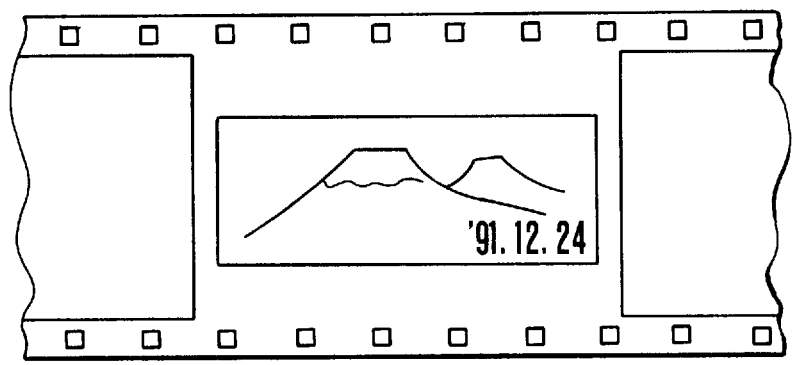
FIG. 4 shows the size of imprinted characters, etc., obtained with a second image plane size selected by the device arranged as the first embodiment.

FIG. 4 shows the size of the shooting image plane, the size of characters imprinted and the position of the imprint obtained in the second image plane size.

Figure 5:
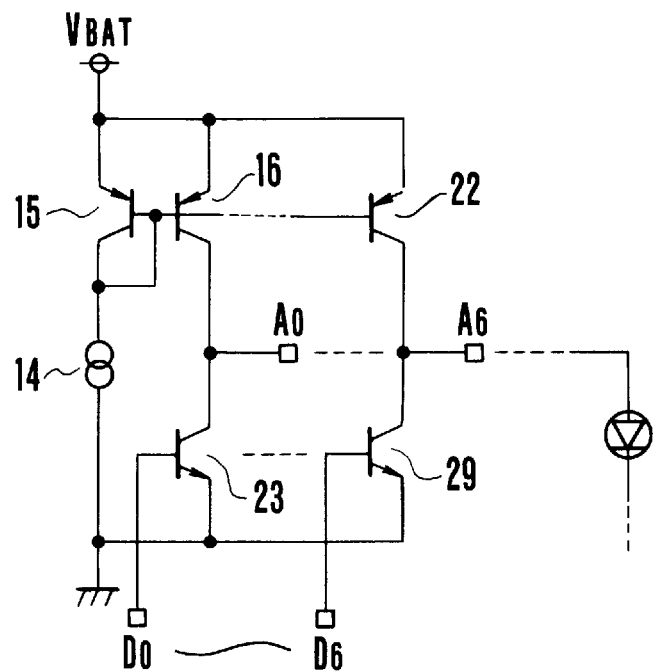
FIG. 5 is a circuit diagram showing an LED driving circuit part disposed within an LED driving circuit shown in FIG. 1.

FIG. 5 is a circuit diagram showing an LED driving circuit part disposed within the LED driving circuit 6 shown in FIG. 1. Referring to FIG. 5, the LED driving circuit part is arranged as follows: This part includes an LED driving constant current circuit 14. PNP transistors 15 and 16 to 22 are arranged as a current mirror with their collectors connected respectively to the anodes of the first and second groups of imprinting LEDs 7a to 7g and 8a to 8g. NPN transistors 23 to 29 are arranged to control switching for every dot (of the imprint). The collectors of the NPN transistors 23 to 29 are connected respectively to the collectors of the PNP transistors 16 to 22.

Figure 6:
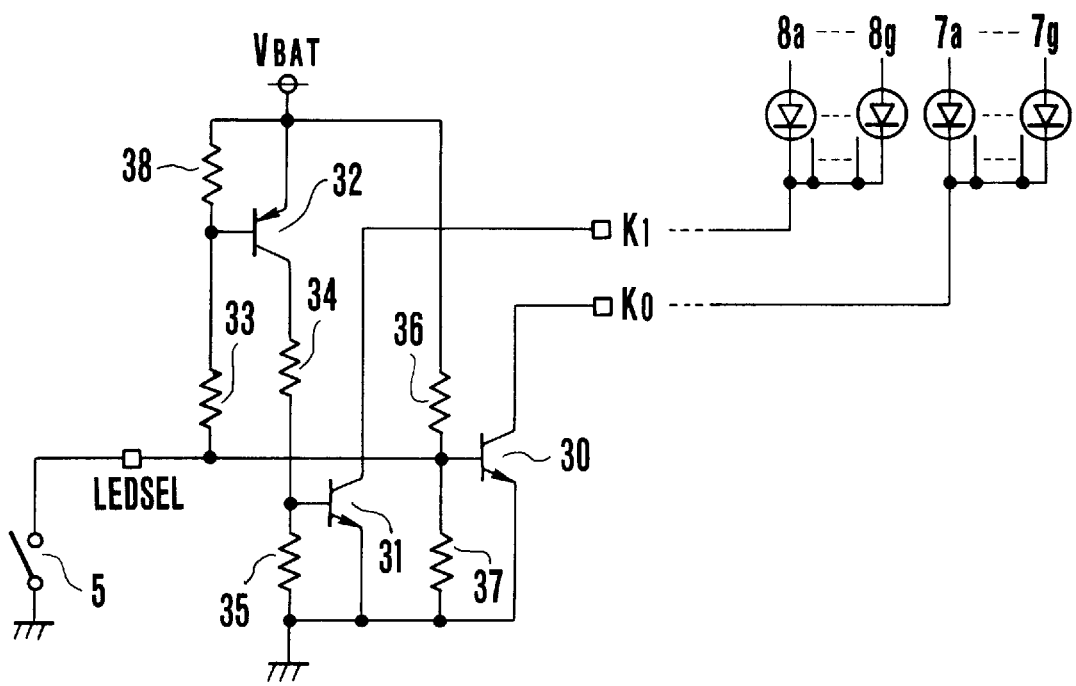
FIG. 6 is a circuit diagram showing an LED selecting circuit part disposed within the LED driving circuit shown in FIG. 1.

FIG. 6 is a circuit diagram showing an LED selecting circuit part disposed within the LED driving circuit 6. That part includes NPN transistors 30 and 31, a PNP transistor 32 and resistors 33 to 38. The collector of the NPN transistor 30 is connected to cathodes of the first imprinting LEDs 7a to 7g which are common terminals thereof. The collector of the NPN transistor 31 is connected to cathodes of the second imprinting LEDs 8a to 8g which are common terminals thereof.

Figure 7:
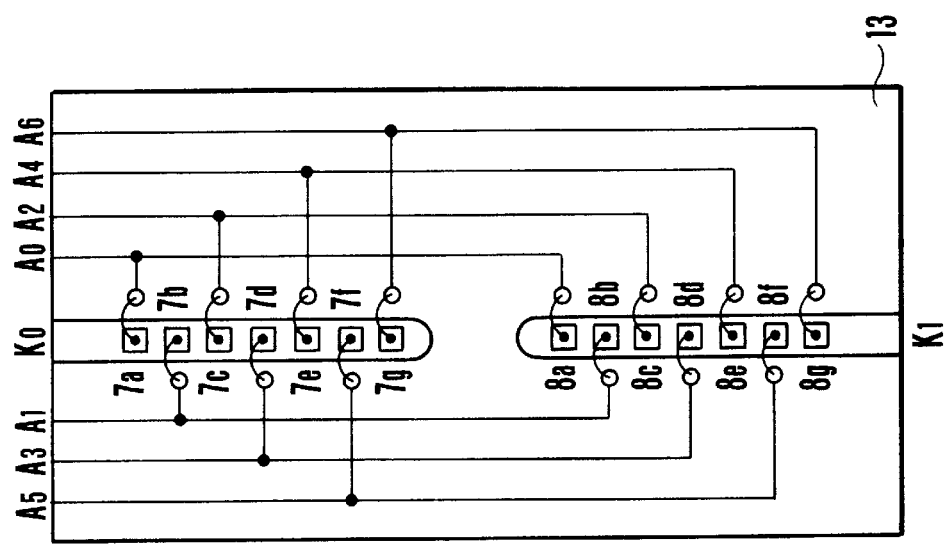
FIG. 7 shows imprinting LEDs of FIG. 1 in a state of being actually mounted on a circuit board.

FIG. 7 shows a circuit board on which the first and second groups of imprinting LEDs 7a to 7g and 8a to 8g are mounted. As shown, the first group of imprinting LEDs 7a to 7g and the second group of imprinting LEDs 8a to 8g are bonded chip by chip. In FIG. 7, reference symbols A1, etc., denote signals. It goes without saying that the LED chips are disposed as closely to each other as possible.

The operation of the above-stated arrangement of the embodiment of this invention is described as follows. The actual change-over of the image plane size is effected with the position of an image plane light-shielding member which is not shown changed from one position over to another in association with a change in the position of the selection switch 5. The operation of the image plane light-shielding member is omitted from the following description.

When the selection switch 5 turns off with the first image plane size selected, the NPN transistor 30 turns on. The levels of the cathodes which are the common terminals of the first group of imprinting LEDs 7a to 7g become a ground level to allow lighting signals D0 to D6 to be inputted to the LEDs 7a to 7g. The LEDs 7a to 7g then light up for imprinting. Under this condition, the NPN transistor 31 is off and the second group of imprinting LEDs 8a to 8g do not light up even if the lighting signals D0 to D6 are inputted, because their cathodes are not selected.

When the selection switch 5 turns on with the second image plane size selected, the NPN transistor 30 turns off. The NPN transistor 31 turns on. As a result, the cathode side of the second group of imprinting LEDs 8a to 8g is selected. The LEDs 8a to 8g then light up to perform imprinting with the lighting signals D0 to D6 inputted to them.

The size of characters thus imprinted is as follows. As shown in FIG. 7, the light emitting means consists of LEDs of seven dots arranged in the same size and spaced at a given pitch on the circuit board 13. The size of the characters is arranged to be variable by changing the magnifying power of the optical system. More specifically, the power of the image forming lens 10 and its position are set at values computed on the basis of a distance between the circuit board 13 and the film 12 and a first optical magnifying rate. The power of the other image forming lens 11 and its position are likewise set at values computed on the basis of the distance between the circuit board 13 and the film 12 and a second optical magnifying rate which is smaller than the first optical magnifying rate. By virtue of this arrangement, characters are imprinted on a film surface in a smaller size when the second image plane size is selected than when the first image plane size is selected.

The two groups of imprinting LEDs are arranged on one and the same circuit board 13. Therefore, there is no unevenness in respect of focus between the two optical systems as long as the distance between the circuit board 13 and each of the two image forming lenses 10 and 11 and the distance between the circuit board 13 and the film 12 are set with adequate precision.

The actions to be performed by the camera for data imprinting, etc., are not directly related to this invention. However, these actions are briefly described as follows. When a shutter button which is not shown is caused to make its first stroke, the camera performs light and distance measuring actions. When the shutter button is further caused to make its second stroke, the lens of the camera is driven in accordance with the result of the light and distance measuring actions. Next, an exposure action is performed on the film 12 by opening and closing a shutter. After the exposure, a film winding motor is driven to begin to wind the film. The data imprinting action is performed during the process of film winding in the following manner. The moving state of the film is first detected. Then, in synchronism with the film movement, either the first group of imprinting LEDs 7a to 7g or the second group of imprinting LEDs 8a to 8g are driven to light up as necessary in such a way as to form characters in a time serial manner. More specifically, the LEDs are lighted up and put out in synchronism with timing given from the camera control circuit 9 to effect imprinting. When a given length of film is wound up after completion of imprinting, the film feeding motor comes to a stop and a series of shooting actions comes to an end.

Figure 8:
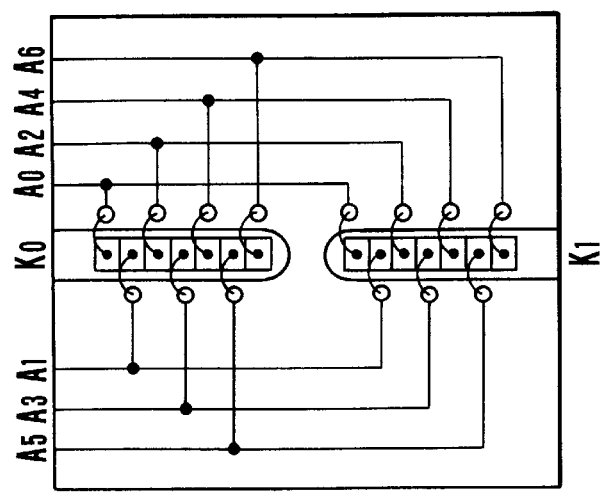
FIG. 8 shows imprinting LEDs of FIG. 1 in a state of being actually mounted on a circuit board in a manner different from the state shown in FIG. 7.

FIG. 8 shows another example of an arrangement of the imprinting LEDs on the circuit board 13. In the case of FIG. 7, a required number of LED chips are arranged on the circuit board 13 in a multi-chip manner. However, each group of LEDs for seven dots may be monolithically arranged by optically and electrically isolating them from each other on one chip as shown in FIG. 8. The monolithic arrangement requires less area for fitting the LEDs than the multi-chip arrangement of FIG. 7 and thus eliminates positional unevenness among chips.

(Second Embodiment)

Figure 9:
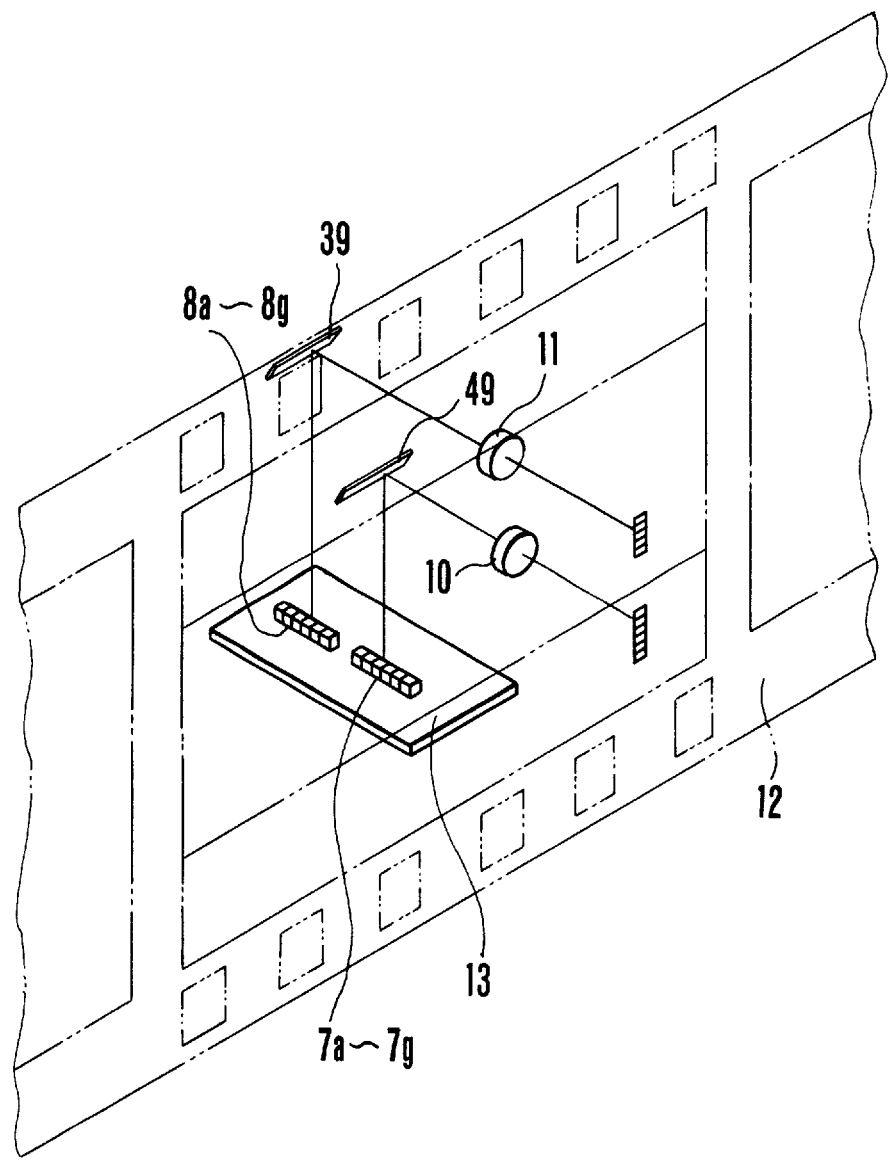
FIG. 9 is an oblique view showing the essential arrangement of an imprinting optical system related to a device arranged as a second embodiment of this invention.

FIG. 9 shows in an oblique view the arrangement of the essential parts of a second embodiment of this invention. In FIG. 9, parts which are the same as those of the first embodiment are indicated by the same reference numerals.

The second embodiment differs from the first embodiment in the following point. The second embodiment uses mirrors 39 and 40 to guide light from the first and second groups of imprinting LEDs 7a to 7g and 8a to 8g to the image forming lenses 10 and 11. The use of these mirrors permits the camera to be more compactly arranged.

In each of the first and second embodiments described, the image forming lens 11 which forms the images of light of the second group of imprinting LEDs 8a to 8g on the film surface 12 is arranged to have a smaller image magnifying power than the image magnifying power of the image forming lens 10 which forms the image of light of the first group of imprinting LEDs 7a to 7g. Therefore, the size of the characters imprinted can be prevented from varying, even if pictures are enlarged in different magnification ratios at the time of printing. While the conventional data imprinting device has necessitated the use of smaller imprinting LEDs when the image plane size is reduced, the embodiment of this invention solves this problem by the use of the optical systems which are arranged to have different image forming magnifying powers.

The embodiments also eliminate the problem with respect to unevenness or fluctuations in optical precision such as focus, etc., because, as shown in FIG. 7 or 8, the first and second groups of imprinting LEDs 7a to 7g and 8a to 8g are arranged on one and the same circuit board 13.

The first and second groups of imprinting LEDs 7a to 7g and 8a to 8g are arranged to be controlled by one and the same LED driving circuit 6. That arrangement not only permits simpler circuit arrangement than the conventional data imprinting device using different LED driving circuits for the different LED groups but also is advantageous in terms of cost.

As described in the foregoing, each of the first and second embodiments of this invention comprises first light emitting means arranged to imprint information on a film surface when a first image plane size defined by a first shooting format is selected, second light emitting means arranged to imprint information on the film surface when a second image plane size defined by a second shooting format and smaller than the first image plane size is selected, a first image forming lens arranged to guide light projected from the first light emitting means to the film surface, and a second image forming lens arranged to guide light projected from the second light emitting means to the film surface and to have a second image forming magnifying power which is smaller than the image forming magnifying power of the first image forming lens. The embodiment is thus arranged to vary the rate of magnifying the image of light emitted to the film surface according to the image plane size selected. The arrangement is such that the data to be imprinted is imprinted on the film surface in smaller characters when the second image plane size is selected than when the first image plane size is selected.

The embodiment further comprises a circuit board which is arranged to have both the first and second light emitting means arranged on the same circuit board.

The embodiment further comprises driving means arranged to detect the image plane size of the camera selected and to drive either the first light emitting means or the second light emitting means according to the image plane size selected. The first and second light emitting means thus can be driven by single driving means.

With the embodiment arranged as described above, the size of data imprinted does not vary at the time of printing even in a case where different image plane sizes are selected and shots are taken in the different image plane sizes, the optical precision is uniformalized for the different image plane sizes, and the circuit arrangement can be simplified.

(Third Embodiment)

Figure 10:
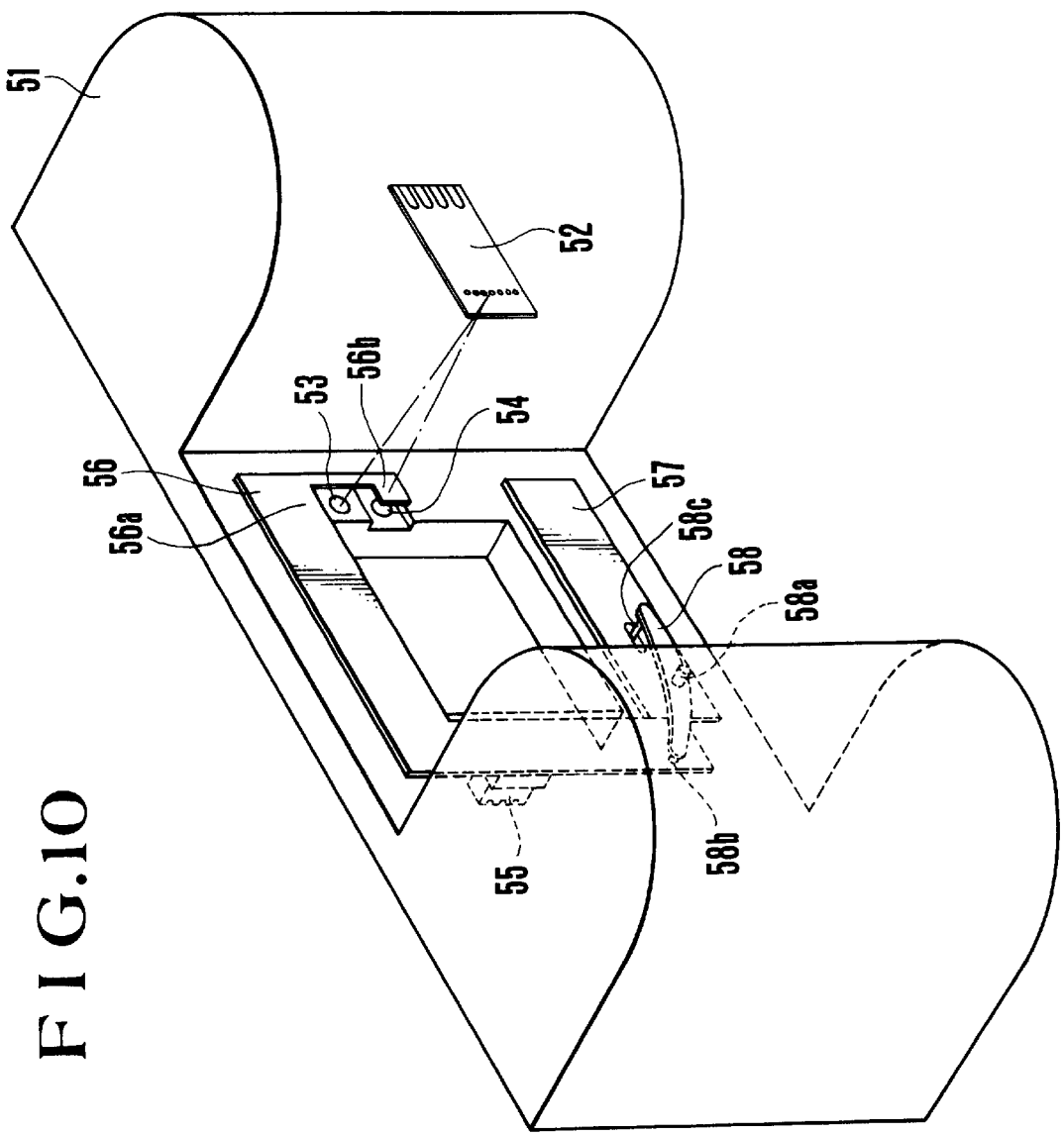
FIG. 10 is an oblique view showing the essential parts of a camera arranged as a third embodiment of this invention as viewed from the front side of the camera.
Figure 11:
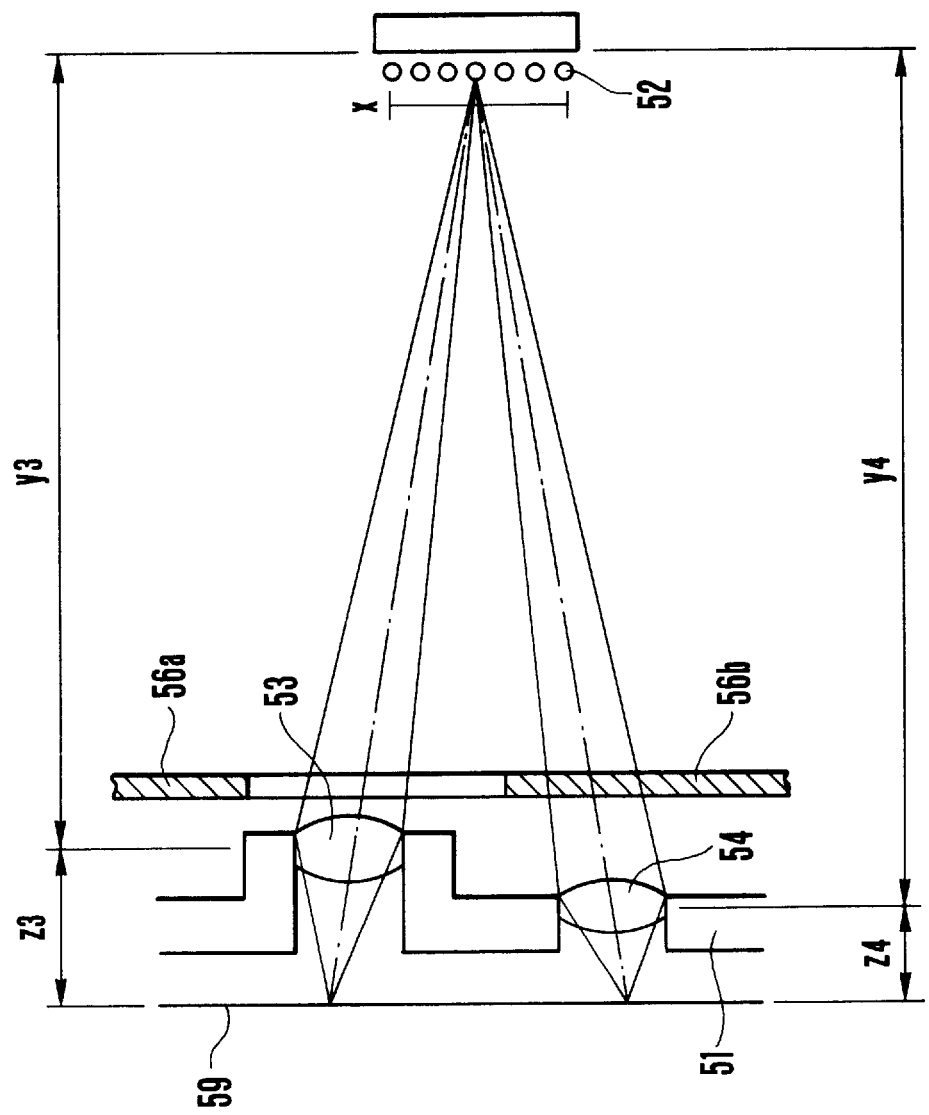
FIG. 11 is a sectional view showing in outline the essential parts of an additional information imprinting device of the camera of the third embodiment of this invention arranged as shown in FIG. 10.

FIGS. 10 and 11 show in outline the essential parts of a camera arranged as a third embodiment of this invention. The third embodiment is arranged as described below with reference to these drawings.

Referring to FIG. 10, the illustration includes a camera body 51, an LED array 52, a first imprinting lens 53 which is provided for imprinting characters when a shot is taken at the full image plane size, a second imprinting lens 54 which is provided for imprinting characters when a shot is taken at the panorama image plane size, and a selection knob 55 which is arranged to be operated in selecting the panorama image plane size. An upper wing 56 is arranged to cover and shield the upper edge of an aperture when the image plane is changed to the panorama image plane size. A lower wing 57 is arranged to cover and shield the lower edge of the aperture when the panorama image plane size is selected. A connection member 58 is arranged to connect the upper wing 56 and the lower wing 57 to each other in such a way as to make their moving directions opposite to each other. The connection member 58 is pivotally carried by a shaft 58a and conversely transmits the movement of the upper wing 56 to the lower wing 57 through first and second shafts 58b and 58c.

FIG. 11 is a sectional view showing a character information imprinting part which is a part of an aperture part of the camera shown in FIG. 10. Referring to FIG. 11, first and second light-shielding parts 56a and 56b are arranged as parts of the upper wing 56 to shield from light respectively the first and second imprinting lenses 53 and 54. In the case of FIG. 11, the full image plane size is selected. In this case, the upper and lower wings 56 and 57 are retracted from the front of the first imprinting lens 53. The second light-shielding part 56b which is a part of the upper wing 56 covers and shields the front of the second imprinting lens 54 from light. On the other hand, when the panorama image plane size is selected, the first light-shielding part 56a which is a part of the upper wing 56 comes to cover the front of the first imprinting lens 53 while the second light-shielding part 56b of the upper wing 56 moves away from the front of the second imprinting lens 54. The optical paths of the imprinting lenses 53 and 54 are thus formed in association with changes taking place in the image plane size. The character information is imprinted through only one of the imprinting lenses according to the image plane size selected.

The dimension in the direction of height of the character information to be imprinted can be expressed by the dimension x in the height direction of the LED array 52 shown in FIG. 11, a distance y3 from the LED array 52 to the first imprinting lens 53 or a distance y4 from the LED array 52 to the second imprinting lens 54 and a distance z3 from the lens 53 to the film surface 59 or a distance z4 from the lens 54 to the film surface 59. In other words, the dimension in the direction of height of the character information to be imprinted can be expressed as "x (z3 / y3)" with the full image plane size selected and as "x (z4 / y4)" with the panorama image plane size selected. This dimension in the height direction of the character information can be set to have a ratio "(z3×y4) / (y3×z4)" between two character sizes at "2" or "3/2" by varying the focal length of the lens.

Figure 12:
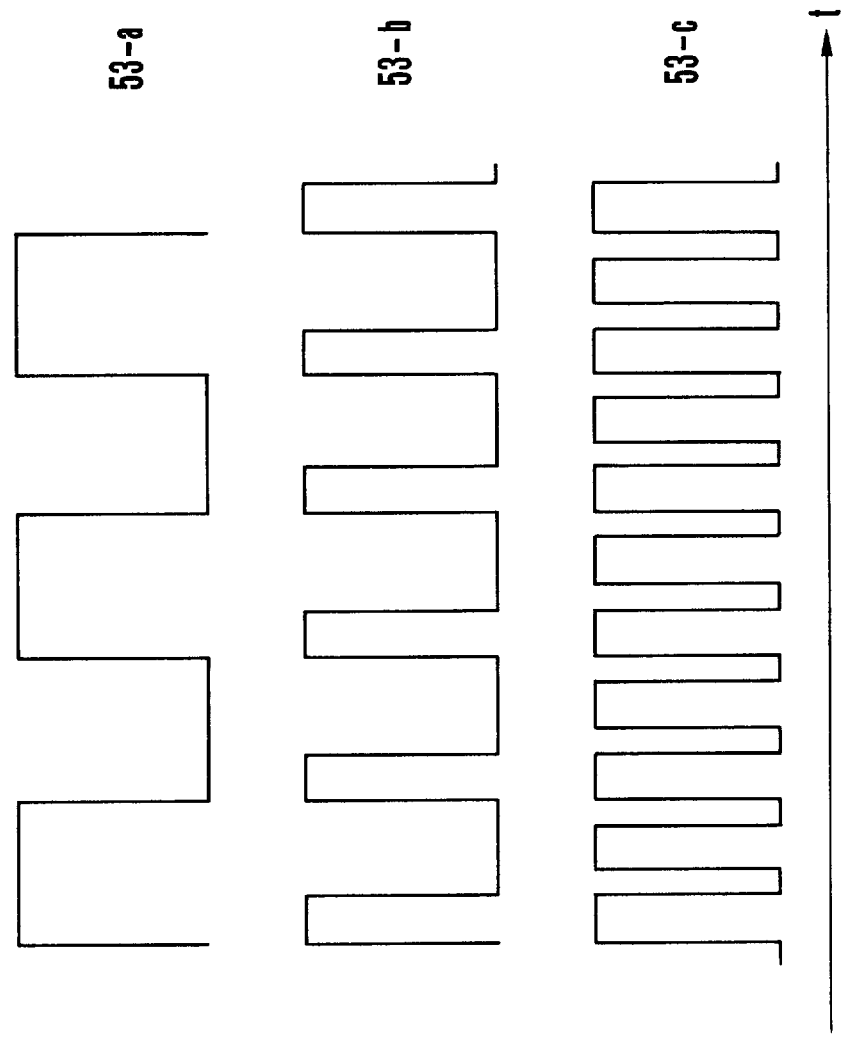
FIG. 12 shows pulses which are arranged to be applied to an LED array and to have their intervals and widths varied for causing the lateral dimension of a character imprint on a smaller image plane to be smaller than that of a character imprint on a larger image plane.

FIG. 12 shows driving signals to be applied to the LED array 52 for the purpose of determining the lateral dimension of the character information. These signals include a signal 53-a outputted according to the film feeding from an encoder which is arranged to detect the moving amount of the film, a trigger signal 53-b generated in response to the rises and falls of the signal 53-a by an LED array driving circuit, and a trigger signal 53-c which has the number of pulses twice that of the trigger signal 53-b and is obtained by interpolating the pulse intervals of the trigger signal 53-b by using a timer.

The trigger signal 53-c is arranged, for example, to give one character dot by four pulses in the full size mode and by two pulses in the panorama size mode. In this case, assuming that the size of imprint in the lateral direction is "1" in the full size mode, it becomes "½" in the panorama size mode. It is also possible to give one character dot by three pulses in the full size mode and by two pulses in the panorama size mode. In that case, the lateral size obtained in the panorama size mode becomes "⅔" of the lateral size obtained in the full size mode. The character sizes thus can be arranged in an integral ratio to each other.

Therefore, the ratio of sizes in the height direction which is determined by the optical system and the ratio of sizes in the lateral direction which is determined by the electrical control method of selecting trigger pulses can be arranged to be about equal to each other. By this arrangement, the character imprints, each consisting of the same characters of, for example, a "7×5" matrix can be formed in about the same proportion for both the full size image plane and the panorama size image plane.

The above-stated arrangement enables the camera to change the character size without recourse to such an arrangement as to have the same characters, for example, in a "9×5" matrix in addition to the "7×5" matrix. The arrangement of the embodiment thus makes the size of the character imprint variable by using the same small number of memories as the conventional camera arranged to permit shooting only at the full image plane size.

In the case of the third embodiment described above, this invention is applied to a camera arranged to permit switch-over between a panorama size image plane and a full size image plane. However, the size of characters to be imprinted on the full size image plane can be arranged to be variable by laterally arranging imprinting lenses and by simply arranging an operation member as a character size selection knob. With the camera arranged in this manner, the size of the character imprint can be changed to a smaller size or to a larger size as desired.

Further, by arranging the camera to perform switch-over by two vertical steps in association with film feeding and film rewinding, characters can be imprinted in different positions (by two steps) both in winding and rewinding the film. With the camera arranged in that manner, twice as many characters as those of the normal imprint can be imprinted and recorded on one and the same image plane by imprinting in a reverse order, at the time of film rewinding, the data which is stored at the time of film winding.

(Fourth Embodiment)

Figure 14:
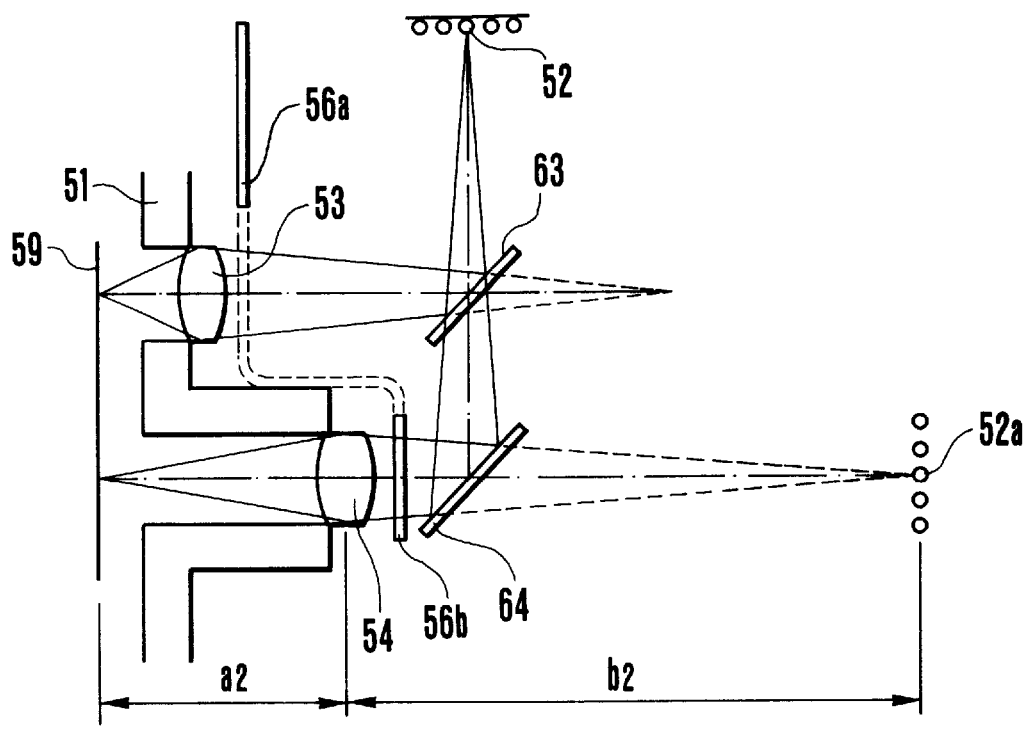
FIG. 14 is a sectional view showing in outline the essential parts of an additional information imprinting device of the camera shown in FIG. 13.

FIGS. 13 and 14 show a fourth embodiment of this invention. FIG. 13 shows in an oblique view the essential parts of a camera arranged as the fourth embodiment. FIG. 14 shows in a sectional view the essential parts of the same camera. The fourth embodiment of the invention is described with reference to FIGS. 13 and 14 as follows.

In FIGS. 13 and 14, the parts 51 to 59 are the same as those of FIG. 10 which shows the third embodiment. Therefore, the details of them are omitted from the following description, which covers only such parts that differ from the parts of the third embodiment.

The fourth embodiment includes a beam splitter 63 and a mirror 64. The beam splitter 63 is arranged to reflect only about one half of light obtained by energizing the LED array 52. The reflected light is projected on the film surface 59 by the first image forming lens 53 in such a way as to imprint character information on the film surface 59. Further, the beam splitter 63 allows the remaining half of the light of the LED array 52 to pass through it. The light thus allowed to pass through the beam splitter 63 is caused to change its direction by the mirror 64 in such a way as to be projectable on the film surface 59 by the second image forming lens 54.

Although the parts 52 to 54 and 56 are the same as those of FIG. 10, they differ in positional relation as shown in FIG. 14. The LED array 52 is disposed perpendicular to the plane of the aperture. The LED array 52, the first and second image forming lenses 53 and 54 are arranged in such a way as to be at such a distance from each other on the optical path of the light of the LED array 52 that satisfies a relation which will be described hereinafter. Further, the upper wing 56 is provided with a bent part which is arranged to allow the first and second light-shielding parts 56a and 56b of the upper wing 56 to be movable up and down in different positions in the direction of optical axis in such a way as to adjust them respectively to the positions of the first and second image forming lens 53 and 54.

Referring to FIG. 14, the positional relation to be obtained on the optical path of the light from the LED array 52 among the LED array 52 and the first and second image forming lenses 53 and 54 is as follows.

The image on the film surface 59 is imprinted in a size proportional to the height of the size of "a2 / b2" which is determined by a distance a2 between the lens 54 and the film surface 59 (see FIG. 14) and a distance b2 between the lens 54 and a conjugate point 52a of the LED array 52 with respect to the mirror 64 (a spurious light source). The embodiment is arranged to perform the imprinting action at an interval which is an integer times as much as a ratio c/b of the output pulses of a film detection pulse plate (not shown) which is arranged to detect the film feeding action of a dot date type camera. Then, a ratio between "a1/b1=E" for the full size and "a2/b2=F" for the panorama size is arranged to be "F/E=c/b". By this arrangement, analogous characters are imprinted on the film. The characters can be imprinted in a desired size by electrically selecting the ratio c/b and by optically selecting the ratio F/E.

Figure 15:
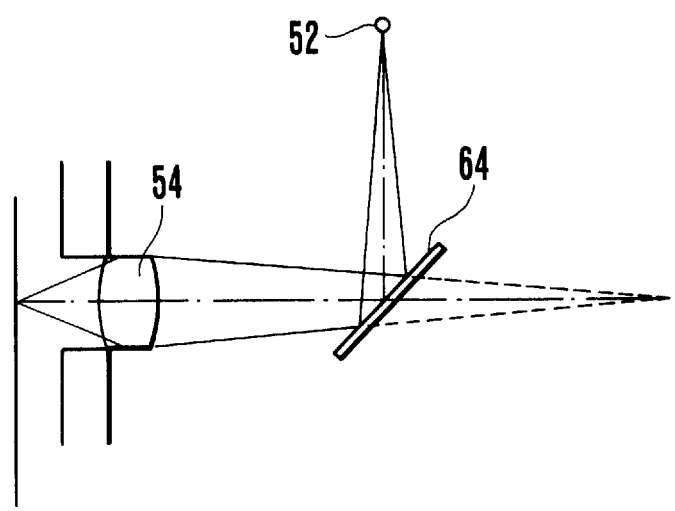
FIG. 15 is a schematic representation of the character imprinting device of the conventional camera.

FIG. 15 shows the optical system of a character information imprinting device employed by the conventional camera. The optical system comprises an LED array 52, an image forming lens 54 and a mirror 64. In accordance with this invention, the character information imprinting device of the conventional camera is simply modified by adding the beam splitter 63 and the first and second light-shielding parts 56a and 56b which are disposed on the upper wing 56 in such a way as to permit the character information to be imprinted in two different places with very simple arrangement.

(Fifth Embodiment)

Figure 16:
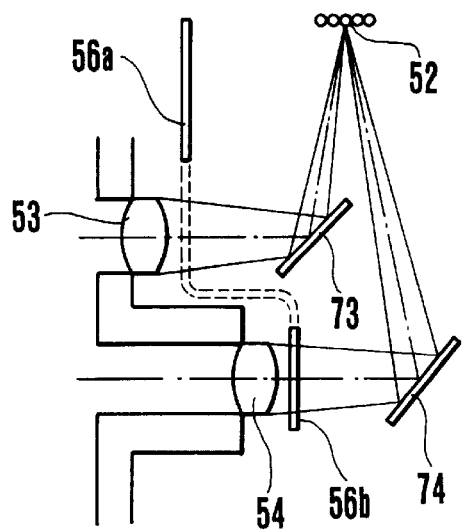
FIG. 16 is a sectional view showing in outline the essential parts of an additional information imprinting device of a camera arranged as a fifth embodiment of this invention.

FIG. 16 schematically shows the arrangement of a fifth embodiment of this invention. The illustration includes an LED array 52, a first mirror 73, and a second mirror 74. In the case of the fifth embodiment, imprinting is performed by using light obtained in different directions, utilizing the fact that the light emitted by LEDs has little directivity. The first and second light-shielding parts 56a and 56b are arranged to play the same roles as those of the fourth embodiment.

(Sixth Embodiment)

Figure 17:
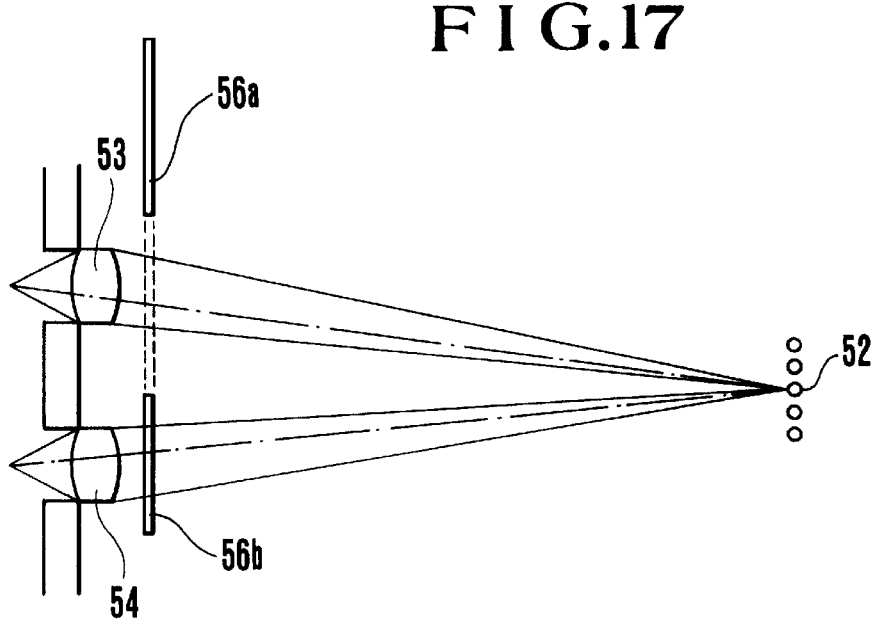
FIG. 17 is a sectional view showing in outline the essential parts of an additional information imprinting device of a camera arranged as a sixth embodiment of this invention.
Figure 18:
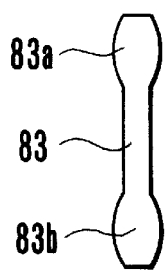
FIG. 18 shows by way of example a modification of a part of the information imprinting device shown in FIG. 17.

FIG. 17 schematically shows the arrangement of a sixth embodiment of this invention. The sixth embodiment is arranged to use somewhat oblique light by utilizing also that the light emitted by LEDs has little directivity. First and second image forming lenses 53 and 54 are arranged to form images respectively in different positions. In this case, the LED array 52 is disposed in a position between the first and second image forming lenses 53 and 54 (on an axis of symmetry). The two lenses used by the sixth embodiment are arranged to be identical with each other. The arrangement of the sixth embodiment may be changed, as shown in FIG. 18, to use a single lens member 83 which consists of two optically symmetric lens parts 83a and 83b.

As described in the foregoing, each of the third to sixth embodiments is arranged to change the size of the characters to be imprinted by selectively using the optical systems of different magnifying powers. By virtue of this arrangement, the LED arrays can be fully used to give high quality characters both for shooting at the full image plane size and for shooting at the panorama image plane size. The characters are imprinted in a suitable size for shooting at the full size. The characters can be imprinted in a smaller size for shooting at the panorama size in anticipation of a larger enlarging magnification ratio at the time of printing. The arrangement of the embodiment thus eliminates the possibility of having a panorama size picture caused to become disagreeable by any excessively large character imprint.

Each of the third to sixth embodiments of this invention requires the use of only a single LED array as the optical path is arranged to be split by taking advantage of (1) that the image forming lenses for imprinting character information are arranged between a light emitting part and a film, (2) that this arrangement gives a space and (3) that the light emitted by imprinting LEDs has almost no directivity. The arrangement thus not only enables the characters to be imprinted in a suitable size for each of the two different image plane sizes but also minimizes an increase in cost of the camera.

Further, it is possible to arrange a light-shielding plate to permit selective imprinting by moving the light-shielding plate either together with the image plane size switching operation part or in association with the latter. The provision of such a light-shielding plate enables the character imprint to be made either in a position suited for the full size image plane or in a position which is closer to the optical axis and suited for the panorama size image plane in taking a panorama shot.

Further, the imprint can be made in a desired size by appositely selecting the position and focal length of the imprinting lens. Therefore, characters to be imprinted can be prevented from disproportionately appearing in a printed photograph.

What is claimed is:

1. A data recording apparatus, compsing:
   a) a light emitting device;
   b) a first optical system for recording data at a first position by using light from the light emitting device;
   c) a second optical system, having a different optical axis from the first optical system, for recording data at a second position different from the first position by using light from the light emitting device; and
   d) a light shielding device selectively changeable at least between a first light shielding state to shield the light for forming an image by the first optical system and a second light shielding state to shield light for forming an image by the second optical system.

2. An apparatus according to claim 1, wherein said light shielding device includes means for, when light having passed one of said first optical system and said second optical system is used for recording data, shielding light having passed the other of said first optical system and said second optical system.

3. An apparatus according to claim 1, wherein said light shielding device includes means for causing a light shielding member to enter said first optical system or said second optical system so as to shield light.

4. An apparatus according to claim 1, wherein said first and second optical systems include respectively means for causing light emitted from a common light source to pass.

5. An apparatus according to claim 1, further comprising a light emitter for emitting light for the data recording.

6. An apparatus according to claim 1, further comprising means for recording data different from images on an image recording medium.

7. An apparatus according to claim 6, wherein said light shielding device includes means for changing over the light shielding state according to change of an area used by the image recording in an image recording area of the image recording medium.

8. An apparatus according to claim 6, wherein said light shielding device includes means for changing over the light shielding state in response to change of a printing area to be used for printing in an image recording area of the image recording medium.

9. An apparatus according to claim 1, wherein said first optical system includes means for guiding the light to a first position to record the data at the first position, and said second optical system includes means for guiding the light to a second position different from said first position to record the data at the second position, and wherein said light shielding device includes means for changing over the light shielding state according to a position at which data is recorded.

10. An apparatus according to claim 9, wherein said apparatus is arranged to record data different from images on an image recording medium and said light shielding device includes means for performing the light shielding in response to setting of an image recording area to be used by the image recording in an image recording area of the image recording medium in such a manner that said second position is included in the image recording area to be used by the image recording.

11. An apparatus according to claim 9, wherein said apparatus is arranged to record data different from the images on an image recording medium and said light shielding device includes means for performing the light shielding in response to setting of a printing area to be used for printing in an image recording area on the image recording medium in such a manner that said second position is included in the printing area to be used by the image recording.

12. An optical apparatus, comprising:
   a) a light emitting device;
   b) a first optical system for recording data at a first position by using light from the light emitting device;
   c) a second optical system, having a different optical axis from the first optical system, for recording data at a second position different from the first position by using light from the light emitting device; and
   d) a light shielding device selectively changeable at least between a first light shielding state to shield the light for forming an image by the first optical system and a second light shielding state to shield light for forming an image by the second optical system.

13. A camera, comprising:
   a) a light emitting device:
   b) a first optical system for recording data at a first position by using light from the light emitting device;
   c) a second optical system, having a different optical axis from the first optical system, for recording data at a second position different from the first position by using light from the light emitting device; and
   d) a light shielding device selectively changeable at least between a first light shielding state to shield the light for forming an image by the first optical system and a second light shielding state to shield light for forming an image by the second optical system.

14. A data recording apparatus, comprising:
   a) a light emitter for emitting light for data recording;
   b) a dividing device for dividing light from said light emitter at least into a first light and a second light, said dividing device assigning a part of the light from said light emitter to said first light and assigning at least a part of the remainder of the light from said light emitter to said second light;

c) a first light guide for guiding said first light for the data recording; and d) a second light guide, different from said first light guide, for guiding said second light for the data recording.

15. An apparatus according to claim 14, wherein said dividing device includes means for dividing the light in such a manner that said first light is emitted from said light emitter in a first direction and said second light is emitted from the light emitter in a second direction different from said first direction.

16. An apparatus according to claim 14, wherein said dividing device includes a half-mirror for dividing the light from said light emitter into a transmission light and a reflection light.

17. An apparatus according to claim 16, further comprising change-over means for changing over between performance and non-performance of the data recording using said first light guided by said first light guide.

18. An apparatus according to claim 17, wherein said change-over means includes shielding means for shielding said first light guide.

19. An apparatus according to claim 14, further comprising means for recording area different from image on the image recording medium.

20. An apparatus according to claim 19, further comprising a change-over device which changes over between performance and non-performance of the data recording using the first light of said first light guide according to change of an image recording area to be used for the image recording of said recording medium.

21. An apparatus according to claim 19, further comprising a change-over device which changes over between performance and non-performance of the data recording using the first light of said first light guide according to change of an image recording area to be used for printing on the image recording medium.

22. An apparatus according to claim 14, wherein said first light guide includes means for guiding the first light to a first position to record data at the first position and said second light guide includes means for guiding the second light to a second position different from the first position to record data at the second position.

23. An optical apparatus, comprising:

a) a light emitter for emitting light for data recording;

b) a dividing device for dividing light from said light emitter at least into a first light and a second light, said dividing device assigning a part of the light from said light emitter to said first light and assigning at least a part of the remainder of the light from said light emitter to said second light;

c) a first light guide for guiding said first light for the data recording; and d) a second light guide, different from said first light guide, for guiding said second light for the data recording.

24. A camera, comprising:

a) a light emitter for emitting light for data recording;

b) a dividing device for dividing light from said light emitter at least into a first light and a second light, said dividing device assigning a part of the light from said light emitter to said first light and assigning at least a part of the remainder of the light from said light emitter to said second light;

c) a first light guide for guiding said first light for the data recording; and d) a second light guide, different from said first light guide, for guiding said second light for the data recording.

* * * * *

UNITED STATES PATENT AND TRADEMARK OFFICE
CERTIFICATE OF CORRECTION

PATENT NO. : 5,771,415
DATED : June 23, 1998
INVENTOR(S) : Koichi Matsumura, et al.

It is certified that error appears in the above-identified patent and that said Letters Patent is hereby corrected as shown below:

Col. 11, line 32, delete "compsing" and insert -- comprising --.

Signed and Sealed this

Fifth Day of October, 1999

Q. TODD DICKINSON

Attest:

Attesting Officer

Acting Commissioner of Patents and Trademarks